Nov. 22, 1960 F. A. J. DOUCHET 2,960,816

MACHINE FOR COVERING TELEPHONE CABLE CONDUCTORS

Filed Jan. 28, 1957 2 Sheets-Sheet 1

United States Patent Office 2,960,816

Patented Nov. 22, 1960

2,960,816

MACHINE FOR COVERING TELEPHONE CABLE CONDUCTORS

Florimond Aristide Jules Douchet, Paris, France, assignor to Societe Alsacienne de Constructions Mecaniques, Paris, France Filed Jan. 28, 1957, Ser. No. 636,731

Claims priority, application France Jan. 26, 1956

2 Claims. (Cl. 57—16)

This invention relates to improvements in machines for covering an electrically conducting wire for a telephone cable with a string of insulating material helically wound around said wire. It relates more particularly to a device whereby this material is wound with a periodically and continuously variable pitch.

Certain insulated conductors used in the construction of telecommunication cables, and particularly in long-distance telephone circuits, consist of a copper conductor around which is wound a paper string disposed in the form of a helix having spaced turns. This assembly is itself covered by a paper strip also wound in the form of a helix with a slight overlap. The copper conductor is thus centered along the axis of a paper tube, the centering being effected by the string. The process of carrying out the operations thus mentioned (i.e. placing in position the string and the paper) is normally designated as "covering the wire." Four insulated conductors thus assembled are twisted together in order to form a unit for transmitting telephonic currents, known as "star quad."

Two diagonally disposed conductors form a first circuit transmitting a first group of conversations, the two other conductors disposed at the ends of the second diagonal form a second circuit transmitting a second group of conversations. An assembly of several quads forms a telephone cable.

For the optimum performance of a telephone cable, it is very important for the telephonic currents fed into one circuit not to induce any current in the other circuits of the cable, or else a telephone conversation in one circuit would be heard on the adjacent circuits. This disturbing phenomenon is known as "crosstalk."

To completely avoid this, it would be necessary for:

(*a*) the permittivity of the medium surrounding each of the conductors of a quad to be the same for each of the conductors of this quad, (*b*) the four conductors forming the quad to be disposed in accordance with the apices of a square, in a cross-section thereof.

As such conditions are hardly fulfilled in practice, it has been proposed to substitute systematical irregularity for perfect regularity and to rely on statistical compensation of crosstalk effects over a sufficient cable length. This can be done, for instance, by irregularly varying the winding pitch of the insulating string. However, satisfactory results cannot be obtained in that way unless the variation law of the pitch is a perfectly defined one. Further, the known variable pitch devices do not allow to vary continuously said pitch, as they usually comprise rather bulky speed or pitch-changing devices which cannot operate without stopping the machine and consequently momentarily interrupting the process of manufacture.

According to the invention there is provided a machine in which the pitch of winding of the insulating material around each of the conductors forming a star quad is not constant, but may follow a law of continuous variation which periodically modifies the value thereof about a mean value common to the four conductors, the parameters of this periodic variation being given different values from one conductor to another.

The invention also provides an improved device in which the translational speed of each wire is continuously variable, and oscillates about a mean value common to the four conductors forming each quad.

The above-mentioned device is advantageously incorporated in the device driving the wheel which pulls the conductor into the covering machine, the drive being effected from a main transmission shaft.

The device of the invention consists of a differential gearing, one of the planetary pinions of which is connected to the main transmission shaft, and the other to the shaft of the wire-pulling wheel, while a satellite pinion connecting the two planetary pinions is carried by an auxiliary shaft to which is imparted a reciprocating movement in a plane perpendicular to the common plane to the axes of the two shafts carrying said planetary pinions. The reciprocating movement of the shaft of said satellite pinion is effected by a crank-wheel driven by the main transmission shaft and by a connecting rod connecting the crankpin of the crank-wheel to a point on the shaft of said satellite pinion.

The advantages of the invention will be better understood from the description given in greater detail hereinafter with reference to the attached drawings, in which.

Figures 7, 8:
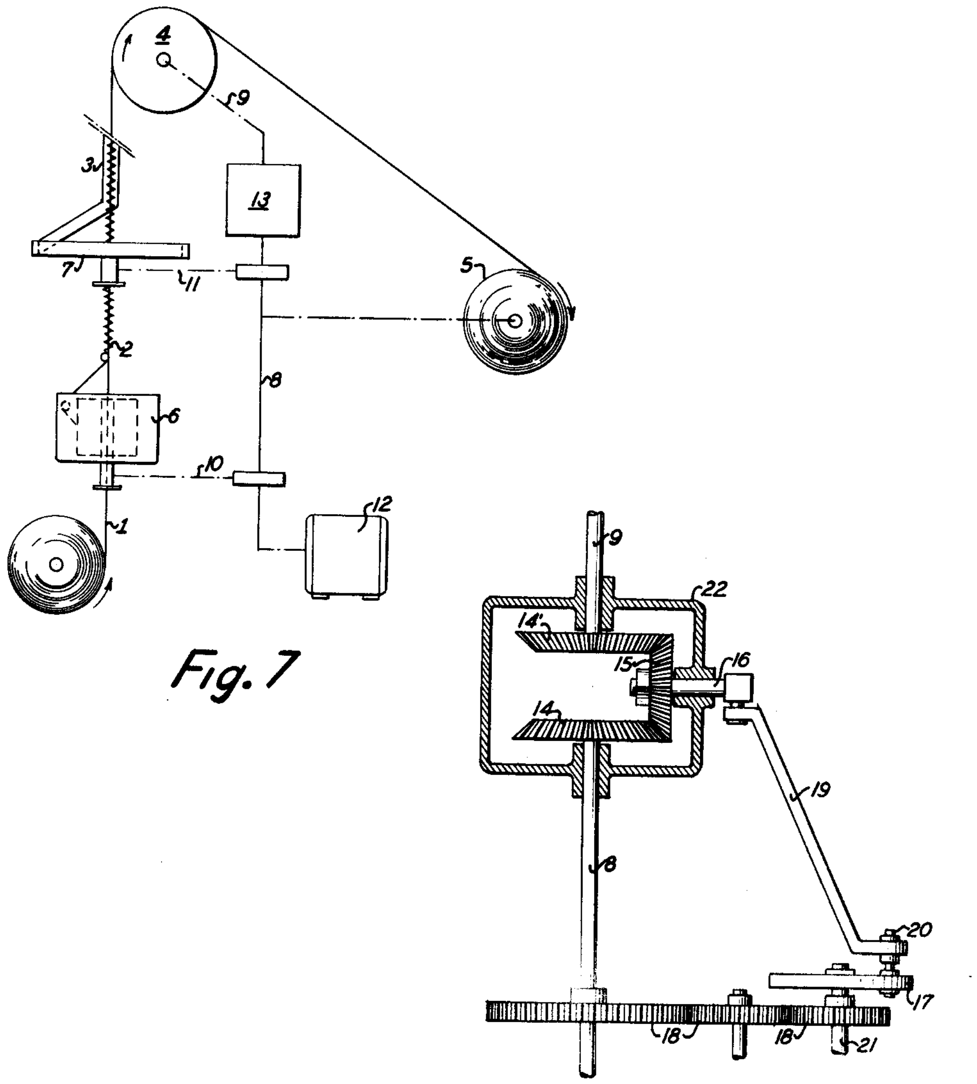
Figure 9:
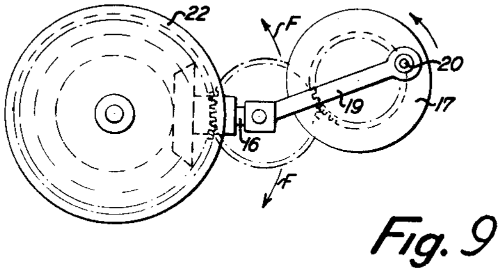

Figure 7 diagrammatically illustrates a covering machine according to the invention;

Fig. 8 shows in detail, partly in perspective and partly in cross-section, a continuously variable speed device according to the invention, and Fig. 9 is a view of a part of Fig. 8 in projection on a plane perpendicular to that of Fig. 8.

Figure 1:
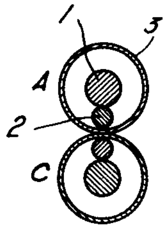
Figure 1 shows a transverse section through two adjacent conductors of a quad consisting of conductors covered in accordance with the process in known art.
Figure 2:
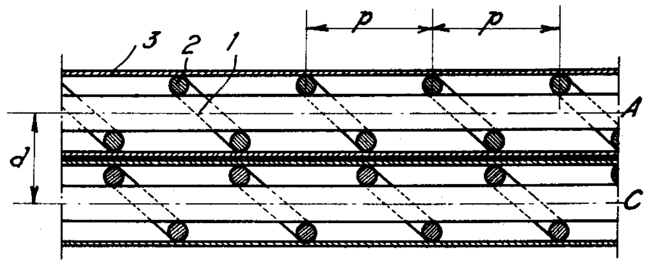
Figure 2 shows a longitudinal section through the same conductors.

In the covering process according to known art illustrated in Figures 1 and 2, a wire A consists of a copper conductor 1, a string 2 wound in the form of a helix of constant pitch *p*, and a sheathing paper 3 being wound in the form of a helix around the two preceding elements.

Figure 3:
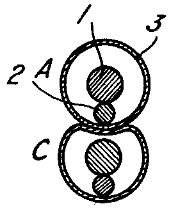
Figure 3 is a transverse section similar to that in Figure 1, the relative positions of two adjacent wires exhibiting, however, a fault which the invention proposes to avoid.
Figure 4:
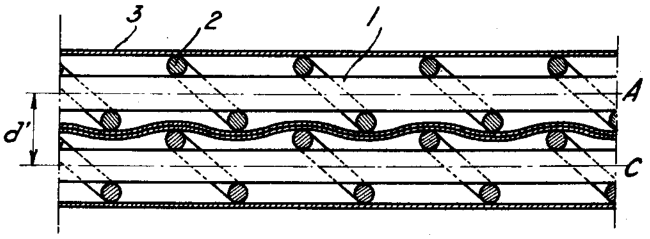
Figure 4 is a longitudinal section corresponding to the section in Figure 3.
Figure 5:
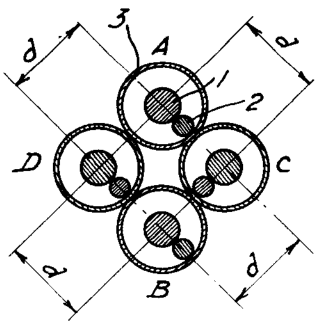
Figure 5 shows a transverse section through a theoretical quad.

If the paper sheathing were perfectly rigid and undeformable, two adjacent wires A and C would appear as shown in Figures 1 and 2. The distance $d$ between the axes of the two conductors would be precisely determined, and the assembly of four wires ABCD covered at the same pitch with string would give the perfect quad in Figure 5. In fact, the paper tube 3 thus formed only has slight resistance to deformation since the positions of the strings 2 in the two adjacent wires A and C never actually agree in the four conductors ABCD in order to form the quad, and also during manipulation of this quad in order to form the cable, forces are set up on the wires tending to deform the paper tubes 3 as shown in Figures 3 and 4.

Figure 6:
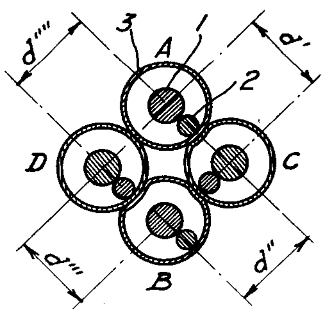
Figure 6 is a transverse sectional view of a quad produced by the usual covering process.

The result of this is that the distance $d$ between the axes of the conductors is never constant, and that it assumes uncertain values $d'$, $d''$, $d'''$, $d''''$, as shown in Figure 6.

This disadvantage which produces crosstalk between the circuits, is considerably reduced by the improvements provided by the invention.

According to the invention, the conductors are covered while effecting a continuous periodic variation in the pitch of the string on one of the adjacent conductors in a manner symmetrical with respect to a mean value which is equal for the four conductors of the quad.

The parameters of the law governing the variations differ from one conductor to another.

When working as has just been described:

(*a*) the mean permittivity of the dielectric medium over a certain length of the quad is the same for the four conductors of the quad;

(*b*) the probability of agreement in position of the strings of two adjacent wires with the theoretical arrangement (Figure 5) is greatly increased, and the fault illustrated in Figures 3 and 4 can consequently no longer be of a systematic character.

During the covering operation, the continuous variation of the pitch of the string can be produced by effecting a periodic variation either of the speed of rotation of the gyratory cup carrying the ball of string, or of the translational speed of the wire in the covering machine.

According to the invention, this variation will preferably be effected on the translational speed of the wire, as shown in Figure 7.

In this figure, the conductor 1 is covered with a string 2 by means of gyratory cup 6; the assembly consisting of the two preceding elements is covered with a paper strip fed from a gyratory cup 7; the conductor thus insulated is driven by a wheel 4 having a pulling action, and then wound on to a spool 5.

The gyratory cups 6 and 7 are given a rotary movement by a shaft 8, via mechanical connecting means 10 and 11.

The shaft 8 is itself driven by a motor 12. The wheel 4 is rotationally driven by a shaft 9 which is itself connected to the shaft 8 by a variable-speed device 13. In the construction according to known art of a covering machine, the member 13 does not exist, the shafts 8 and 9 being directly connected and rotating at the same speed.

Under these latter conditions, the string and the paper are wound in the form of a helix of constant pitch around the conductor 1, while in the improved machine according to the invention the pitch of the said helix varies continuously as stated above.

In the embodiment of the mechanical device for effecting variation according to the invention, diagrammatically shown by way of example in Figures 8 and 9, the device 13 is formed in the following manner:

The shafts 8 and 9 terminate in bevel gears 14 and 14'. The latter are mechanically connected to one another by a satellite pinion 15 loosely fitted on a shaft 16. The latter can oscillate in a plane perpendicular to the general axis of the shafts 8 and 9. These oscillatory movements, which are represented by the arrows F, F' (Fig. 9), are produced by a crank-wheel 17 to which is imparted a continuous rotational movement from the shaft 8 by way of mechanical connecting means 18, the speed ratio of these means being adjustable in order to allow the frequency of variation to be chosen. The continuous movement of the wheel 17 is transformed into an oscillatory movement of the shaft 16 by a connecting rod 19 driven by a crankpin 20 carried by the wheel 17, the distance of the crankpin 20 from the shaft of wheel 17 being adjustable in order that the degree of variation may be chosen.

For greater simplicity of the drawing, in Figs. 8 and 9, the necessary supports for the shafts of the various elements (for instance ball-bearings secured to the general frame of the machine for supporting shafts 8 and 9, as well as the shafts of the various mechanical connection members coupling shaft 8 to shaft 21 of crank-wheel 17) have not been shown, and they are no part of the invention. However, a casing 22 enclosing gears 14, 14' and 15 is shown, as the distance of the latter gear to the axis of the main shaft 8 must, of course, be kept constant, as in any differential gear. The arrangement of members 17, 19 and 20 is more especially shown in Fig. 9.

This kinematic assembly transforms the constant angular velocity of the shaft 8 into a pulsating angular velocity transmitted to the wheel 4 by the shaft 9 and the gear 14'. The operation of the assembly 13 causes the translational speed V of the conductor 1 approximately to follow the law:

$$B = V_0\left(1 + K \cos 2\pi \frac{t}{T}\right)$$

In this formula, $V_o$ signifies the mean speed of the conductor which would be that produced without the use of the variable-speed device; K is an adjustable constant resulting from the dimensions given to the members of the variable-speed device, and representing the degree of variation; T is the period, that is to say the time, separating two successive passages at the speed $V_o$; $t$ is time considered as an independent variable.

The winding pitch of the string follows directly from the preceding law.

With a view to simplification, the preceding device has been described by way of example. Other systems leading to a similar variation in winding pitch also are within the scope of the invention.

For convenience in explanation, it has been supposed that covering is effected with paper strip and string, but the invention has a more general scope, and must be considered to apply to the case in which any other insulating material is wound in the form of a helix around a conductor.

What is claimed is:

1. In a machine for covering an electrically conductive wire with a string of insulating material helically wound around said wire with a continuously variable pitch and comprising a rotatable main driving shaft, a secondary shaft, a wire-pulling wheel secured to said secondary shaft, and means driven by said main shaft for winding said string around said wire at a velocity proportional to that of said main shaft; a continuously variable speed device comprising a differential gear including first and second coaxial planetary pinions and a satellite pinion interconnecting said first and second planetary pinions, means coupling said first planetary pinion to said main shaft for driving said first planetary pinion, means coupling said second planetary pinion to said secondary shaft of said wire-pulling wheel, an auxiliary shaft loosely supporting said satellite pinion, and coupling means between said auxiliary and main shafts and transforming rotary motion of said main shaft into a reciprocating motion of said auxiliary shaft in a plane perpendicular to the common geometrical axis of said first and second planetary pinions.

2. A device as claimed in claim 1 wherein said coupling means between the auxiliary and main shafts comprises a crank-wheel coupled to and driven by said main shaft, a crank pin on said crank-wheel, and a connecting rod connecting the crank pin of said crank-wheel to said auxiliary shaft.

References Cited in the file of this patent

UNITED STATES PATENTS

| | | |
|---|---|---|
| 1,223,434 | Smith | Apr. 24, 1917 |
| 1,616,068 | Trenck | Feb. 1, 1927 |
| 1,904,547 | Schumann | Apr. 18, 1933 |
| 2,087,303 | Rosch et al. | July 20, 1937 |
| 2,089,193 | Dreyfus | Aug. 10, 1937 |
| 2,222,556 | Robinson et al. | Nov. 19, 1940 |
| 2,293,659 | Murray | Aug. 18, 1942 |
| 2,326,220 | Henning et al. | Aug. 10, 1943 |
| 2,453,313 | Gordon | Nov. 9, 1948 |
| 2,645,590 | Mildner et al. | July 14, 1953 |
| 2,783,608 | Hasler | Mar. 5, 1957 |